(12) United States Patent
Johnson

(10) Patent No.: US 9,898,292 B2
(45) Date of Patent: Feb. 20, 2018

(54) HARDWARE INSTRUCTION GENERATION UNIT FOR SPECIALIZED PROCESSORS

(71) Applicant: Mireplica Technology, LLC, Austin, TX (US)

(72) Inventor: William M. Johnson, Austin, TX (US)

(73) Assignee: Mireplica Technology, LLC, Austin, TX (US)

( * ) Notice: Subject to any disclaimer, the term of this patent is extended or adjusted under 35 U.S.C. 154(b) by 0 days.

(21) Appl. No.: 15/054,118

(22) Filed: Feb. 25, 2016

(65) Prior Publication Data

US 2016/0246599 A1    Aug. 25, 2016

Related U.S. Application Data

(60) Provisional application No. 62/120,603, filed on Feb. 25, 2015.

(51) Int. Cl.
*G06F 9/30* (2006.01)
*G06T 1/20* (2006.01)
(Continued)

(52) U.S. Cl.
CPC .......... *G06F 9/3016* (2013.01); *G06F 9/3017* (2013.01); *G06F 9/3881* (2013.01);
(Continued)

(58) Field of Classification Search
CPC .... G06F 9/3016; G06F 9/3017; G06F 9/3881; G06F 9/3893; G06F 9/4552; G06F 15/76; G06F 15/80; G06T 1/20
See application file for complete search history.

(56) References Cited

U.S. PATENT DOCUMENTS 5,796,974 A * 8/1998 Goddard .................. G06F 8/66
                                                         712/209
6,016,395 A * 1/2000 Mohamed ............... G06F 8/447
                                                         717/116

(Continued)

OTHER PUBLICATIONS

International Search Report for PCT/IB2016/052248, 3 pages, dated Jul. 27, 2016.

(Continued)

*Primary Examiner* — Viva Miller
(74) *Attorney, Agent, or Firm* — Gentry McLean, PLLC

(57) ABSTRACT

Methods, devices and systems are disclosed that interface a host computer to a specialized processor. In an embodiment, an instruction generation unit comprises attribute, decode, and instruction buffer stages. The attribute stage is configured to receive a host-program operation code and a virtual host-program operand from the host computer and to expand the virtual host-program operand into an operand descriptor. The decode stage is configured to receive the first operand descriptor and the host-program operation code, convert the host-program operation code to one or more decoded instructions for execution by the specialized processor, and allocate storage locations for use by the specialized processor. The instruction buffer stage is configured to receive the decoded instruction, place the one or more decoded instructions into one or more instruction queues, and issue decoded instructions from at least one of the one or more instruction queues for execution by the specialized processor.

20 Claims, 9 Drawing Sheets

(51) Int. Cl.
*G06F 9/38* (2006.01)
*G06F 15/76* (2006.01)
*G06F 9/455* (2006.01)
*G06F 15/80* (2006.01)

(52) U.S. Cl.
CPC .......... *G06F 9/3893* (2013.01); *G06F 9/4552* (2013.01); *G06F 15/76* (2013.01); *G06F 15/80* (2013.01); *G06T 1/20* (2013.01)

(56) References Cited

U.S. PATENT DOCUMENTS

| | | | |
|---|---|---|---|
| 6,212,628 B1* | 4/2001 | Abercrombie | G06F 9/30014 712/16 |
| 6,292,879 B1* | 9/2001 | Fong | G06F 9/30192 711/141 |
| 6,477,683 B1 | 11/2002 | Killian et al. | |
| 2001/0018697 A1* | 8/2001 | Kunitake | G06F 17/211 715/234 |
| 2005/0172105 A1* | 8/2005 | Doering | G06F 9/30079 712/36 |
| 2007/0118832 A1 | 5/2007 | Huelsbergen | |
| 2010/0153934 A1 | 6/2010 | Lachner | |
| 2013/0307859 A1* | 11/2013 | Johnson | G06T 1/60 345/501 |

OTHER PUBLICATIONS

Search Strategy for PCT/1132016/052248, 1 page, dated Jul. 27, 2016.
Written Opinion of the International Searching Authority for PCT/IB2016/052248, 6 pages, dated Jul. 27, 2016.

\* cited by examiner

HARDWARE INSTRUCTION GENERATION UNIT FOR SPECIALIZED PROCESSORS

RELATED APPLICATIONS

This application claims the domestic benefit under 35 U.S.C. § 119(e) of U.S. Provisional Patent Application No. 62/120,603, entitled "Hardware Instruction Compiler for Specialized Processors," filed Feb. 25, 2015, which application is hereby incorporated by reference in its entirety and for all purposes as if completely and fully set forth herein.

BACKGROUND

An instruction set architecture (ISA) is fundamental to computer processor design and development. The ISA includes the set of instructions for the processor, the instruction format, and processor characteristics such as the type of operands that can be used, the storage mechanisms used for instruction execution and how the storage mechanisms are accessed. The instruction set is used by programmers to communicate programs to the processor. Moreover, the instruction set architecture is used by multiple software "tools" for processor development and programming, including compilers, linkers and debuggers.

A compiler transforms "source code" written in a higher-level programming language to "object code" understandable by a processor. A linker combines one or more object code files created by a compiler into a single executable file, and may also arrange for execution of code in the proper address space of the processor. A debugger is a program used in testing other programs written to run on the processor. These tools along with other development tools for a processor may be referred to as a "tool chain" or "toolchain." Any changes made to a processor's instruction set or other aspects of the instruction set architecture must be reflected throughout the tool chain, in each tool using the ISA.

An ISA is typically tested, revised and verified extensively until deemed satisfactory, at which point a specification, simulator, and development tool chain may be created based on the ISA. Processor design can then proceed based on the ISA as well, including microarchitecture design and verification, implementation of the microarchitecture in a hardware description language (HDL), and circuit synthesis based on the HDL implementation.

The high degree of integration between an ISA and a processor compatible with the ISA, along with the immense undertaking that development of an ISA and related tools represents, can make it difficult to implement specialized processor designs. Creating a new instruction set, or even revising an existing one, can be prohibitively expensive and time-consuming given the array of associated verification and development tools that would also need to be created or modified.

BRIEF DESCRIPTION OF THE DRAWINGS

The following detailed description of various disclosed embodiments makes reference to the accompanying drawings in which.

DETAILED DESCRIPTION

Overview

Figure 1:
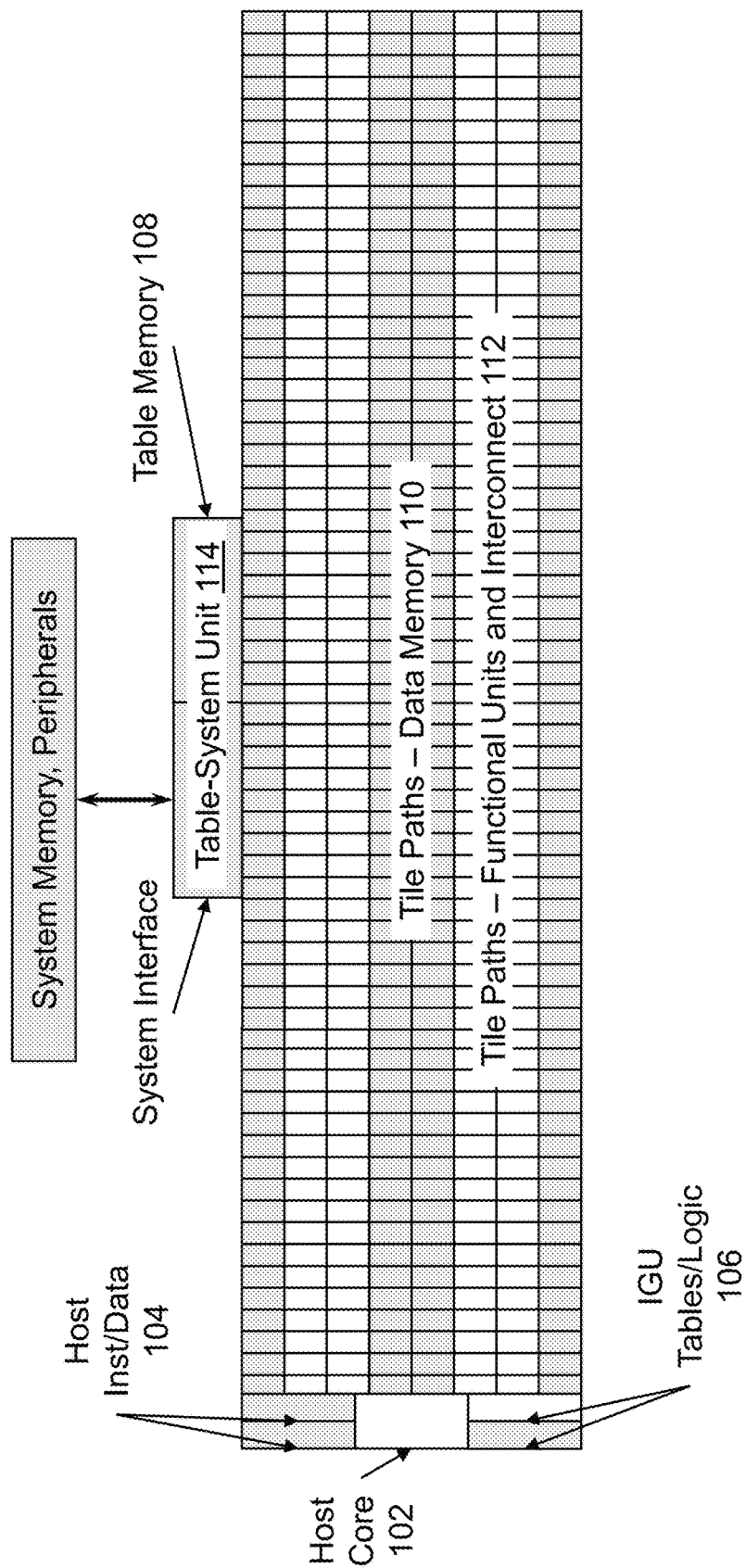
FIG. 1 is a simplified block diagram of an exemplary embodiment of a data processing architecture.

Methods, devices and systems are disclosed that interface a host computer to a specialized processor. In an embodiment, an instruction generation unit configured to interface a host computer to a specialized processor comprises an attribute stage configured to receive a host-program operation code and a first virtual host-program operand from the host computer, where the first virtual host-program operand represents a first operand for the specialized processor. The attribute stage is further configured in this embodiment to expand the first virtual host-program operand into a first operand descriptor, wherein the first operand descriptor provides a description of the first operand in terms of one or more operand attributes. The instruction generation unit further comprises a decode stage configured to receive the first operand descriptor and the host-program operation code from the attribute stage, convert the host-program operation code to one or more decoded instructions for execution by the specialized processor, and allocate storage locations for use by the specialized processor in executing the decoded instructions. This embodiment of the instruction generation unit further comprises an instruction buffer stage configured to receive the decoded instruction from the decode stage, place the one or more decoded instructions into one or more instruction queues, and issue decoded instructions from at least one of the one or more instruction queues for execution by the specialized processor.

In a further embodiment, the instruction generation unit further comprises a memory configured to store an attribute table comprising one or more operand descriptors, and the attribute stage is further configured to determine whether the host-program operation code corresponds to an initial declaration of the first operand. In response to a determination that the host-program operation code does correspond to an initial declaration of the first operand, the attribute stage is further configured to store in the attribute table an entry comprising the first operand descriptor, and to return to the host computer an address of the stored attribute table entry.

In an embodiment, the instruction generation unit interfaces with a specialized processor comprising an array of at least two interconnected processing units, where each processing unit comprises an instruction buffer and a data memory partitioned into at least two regions. In a further embodiment, the first operand comprises a two-dimensional array of data stored across multiple regions of one or more of the data memories of the specialized processor. In a still further embodiment, the respective instruction buffers of the interconnected processing units are connected by an instruction pipeline configured to sequentially convey instructions from one processing unit to the next, the one or more instruction queues comprise a vector instruction queue and a scalar instruction queue, and the instruction buffer stage is further configured to place decoded instructions from the vector instruction queue into the instruction pipeline, in connection with issuing the decoded instructions from the one or more instruction queues.

A method of generating instructions for a specialized processor is also disclosed herein. In an embodiment, the method comprises receiving from a host processor a host-program operation code and a virtual host-program operand, where the virtual host-program operand represents an operand for the specialized processor, expanding the virtual host-program operand into an operand descriptor, where the operand descriptor provides a description of the operand in terms of one or more operand attributes, and converting the host-program operation code to one or more decoded instructions for execution by the specialized processor. This embodiment of the method further comprises allocating storage locations for use by the specialized processor in executing the decoded instructions, placing the one or more decoded instructions into one or more instruction queues, and issuing decoded instructions from at least one of the one or more instruction queues for execution by the specialized processor.

In a further embodiment, the method comprises determining whether the host-program operation code corresponds to an initial declaration of the first operand. In response to a determination that the host-program operation code does correspond to an initial declaration of the first operand, the method comprises storing in an attribute table an entry comprising the first operand descriptor, and returning to the host processor an address of the stored attribute table entry.

In an embodiment, the specialized processor comprises an array of at least two interconnected processing units, where each processing unit comprises an instruction buffer and a data memory partitioned into at least two regions. In a further embodiment, the first operand comprises a two-dimensional array of data stored across multiple regions of one or more of the data memories of the specialized processor. In a still further embodiment, the respective instruction buffers of the interconnected processing units are connected by an instruction pipeline configured to sequentially convey instructions from one processing unit to the next, and the one or more instruction queues comprise a vector instruction queue and a scalar instruction queue. In such an embodiment, issuing the decoded instructions from the one or more instruction queues comprises placing decoded instructions from the vector instruction queue into the instruction pipeline.

A data processing system is also disclosed herein. In an embodiment, the data processing system comprises a host computer configured to run a compiled program, a specialized processor, and an instruction generation unit. The instruction generation unit is operably coupled to the host computer and to the specialized processor, and is configured to receive from the compiled program a host-program operation code and a virtual host-program operand, where the virtual host-program operand represents an operand for the specialized processor. The instruction generation unit is further configured to convert the host-program operation code to one or more decoded instructions for execution by the specialized processor, allocate storage locations for use by the specialized processor in executing the decoded instructions, place the one or more decoded instructions into one or more instruction queues, and issue decoded instructions from at least one of the one or more instruction queues for execution by the specialized processor.

In an embodiment of the data processing system, the specialized processor comprises an array of at least two interconnected processing units, where each processing unit comprises an instruction buffer and a data memory partitioned into at least two regions. In a further embodiment, the respective instruction buffers of the interconnected processing units are connected by an instruction pipeline configured to sequentially convey instructions from one processing unit to the next, and the one or more instruction queues comprise a vector instruction queue and a scalar instruction queue. In such an embodiment, the instruction generation unit is further configured to place decoded instructions from the vector instruction queue into the instruction pipeline, in connection with issuing the decoded instructions from the one or more instruction queues.

The above embodiments, among others described herein, reflect a more generalized way of generating custom instructions for a specialized processor. As an existing approach, U.S. Pat. No. 6,477,683 describes use of a standardized language to describe an instruction set which is configurable in certain specific ways. The description in the standardized language is used to generate tools for development and configuration of a processor. Such solutions allow only a limited number of specific, predefined modifications to an existing architecture, however.

In an embodiment of the approach described herein, an object class library is adapted to be accessed by a conventional compiler, as well as by other tool chain programs and by application program developers. In an embodiment, the object class library contains classes, or templates, associated with an object-oriented programming approach. In such an embodiment, one or more of the classes are configured to be instantiated as objects using data provided by the application program. The object class library contains one or more custom files accessed by, for example, the compiler when an unfamiliar operand or function is encountered in a source file being compiled.

In one embodiment, a custom file within the object class library is a custom instruction macro, or a template used to generate a custom instruction for a custom functional unit, or instruction generation unit, associated with a processor. The custom instruction includes an operation code, or opcode, and one or more operands. In a further embodiment, the custom instruction macro is defined using user-defined instruction capabilities of a conventional compiler. The custom functional unit may also be referred to herein as an "instruction generation unit" or a "hardware instruction compiler." In an embodiment, the custom functional unit translates the custom instruction received from the conventional compiler, including the opcode and operands, into one or more instructions adapted to the hardware configuration of a specialized processor.

Use of the object class library and custom functional unit described above allows a programmer to access the functionality of a specialized processor without having to understand details of the processor's ISA. Desired operations can be described in abstract terms in the programmer's source code. Such operations can then be translated by a conventional compiler (using a custom file in the object class library) into an instruction for the custom functional unit. The custom functional unit can then convert the instruction into one or more instructions suitable for the specialized processor. In an embodiment, the instruction for the custom functional unit is an instruction for constructing, or creating, one or more variables for the specialized processor. Such instructions may be referred to as "constructor instructions" herein. In an embodiment, the processor instruction produced by the custom functional unit is not limited to any particular length or format.

In an additional embodiment, a custom file within the object class library includes source code executable in the compiler's native instruction set to implement a software-based version of one or more functions of the specialized processor. In a further embodiment, this code is compiled when an option to employ the software implementation is selected.

Use of the object class library to implement a software-based version of a processor operation can be used for testing of the (hardware-based) processor operation. In an embodiment, the code implementing the software-based process is executable to perform at least some of the same steps in the same order as the hardware-based processor, to assist in pinpointing errors. As in the case of custom instruction generation for the hardware instruction compiler, operations may be described abstractly by the programmer, and conventional user-definition features of a compiler may be used to call a custom routine from the object class library.

In still another embodiment, program instructions generated using both types of custom file described above—those that include instructions for a software implementation and those used to generate custom instructions for a custom functional unit—are executed. In an embodiment, one of the programs is executed using the specialized processor, while another of the programs is a software-based version of the same program executed in the native instruction set. In a further embodiment, the hardware-based and software-based programs are executed concurrently, at least in part. In a still further embodiment, a testing control module manages execution of the programs and compares results from the hardware-based and software-based execution at one or more points in the calculation or process being carried out.

Tile Processors

An example of a specialized processor that may be used in conjunction with an object class library and hardware instruction compiler as described herein is a tile processor as described in U.S. Pat. No. 9,183,694, which patent is hereby incorporated by reference as if fully and completely set forth herein. The tile processor is adapted for efficient high-throughput processing of two dimensional, interrelated data sets such as those that may be used in image processing. As described further in the above-referenced application, the tile processor employs multiple features, including novel techniques of memory partitioning and instruction sequencing, to perform hardware-based processing. The custom compiling methods and systems described herein are not limited to use with any particular type of specialized processor, however.

"Visual processing" as used herein refers to a general class of processing of image and video picture elements ("pixels") and related data. This includes applications such as enhancing images and converting pixels formats, motion detection and tracking, and identifying features or objects in either still-image or video frames. A tile-processor based visual-processing architecture enables a wide range of programmable, scalable, software-compatible solutions for efficient processing of large, visual datasets. It overcomes the limitations of conventional approaches to this application area, which typically use multiple single-instruction, multiple-data (SIMD) cores in some form of a shared-memory, symmetric multi-processing (SMP) configuration, and use a custom programming and run-time environment to handle issues of processor allocation, communication, and synchronization between processing cores.

In contrast, processing on the tile-processor based architecture employs any number of fine-grained tile paths, automatically allocated and dynamically scaled to the scope of parallelism, requires no global shared memory for communication between tile paths, and bases synchronization on a generalized sequential-execution model. In an embodiment, programming uses standard C++ on a number of industry-standard instruction-set architectures (ISAs) with no compiler re-targeting.

The architecture enables massively parallel execution using a well-understood programming model that requires little understanding of the mechanisms used to provide parallel execution. This is accomplished by presenting the processing hardware as a fully virtualized parallel processor, without the overhead normally implied by virtualization. Virtualization usually incurs performance penalties for interpreting the virtual operations and translating them into hardware operations. Instead, the tile-processor based architecture directly executes abstractions presented by, in an embodiment, C++ object classes, typically with single-cycle execution even though the abstractions represent 100's or 1000's of operations. The virtualization of parallel execution relies on hardware—an instruction-generation unit (IGU)—to both translate virtual instructions into native instructions and to ensure correct parallel execution of native instructions.

FIG. 1 shows a high-level system diagram of the visual-processing architecture, consisting of a local host processor represented by host core 102 and host instructions/data 104, the IGU represented by IGU tables/logic 106, tile paths organized in a tile-path array (256 tile paths in this example), a system interface, and a global table 108. The tile paths in FIG. 1 are shown as combinations of local data memory 110 (shaded) portions and processing logic (e.g., functional units and interconnect) 112 (white) portions. The series of 256 tile paths is folded into four rows. There is a very high degree of structure and regularity, and most of the control overhead is limited to the IGU and Table-System Unit.

A tile path is a simple processing element consisting of functional units, an optional register file including optional accumulators, and local data memory (DMEM). There is no instruction memory and no instruction-fetch logic. The instructions executed by tile paths perform only visual-processing operations, and the DMEM and register file are used only for pixels and related data, with no overhead for program control etc. Tile paths do little beyond just executing instructions: control logic is mostly dedicated to interconnect and data coherency between tile paths. Tile paths are structured into tile arrays of any number of tile paths, though typically there are 256-1024 tile paths per array.

Figure 2:
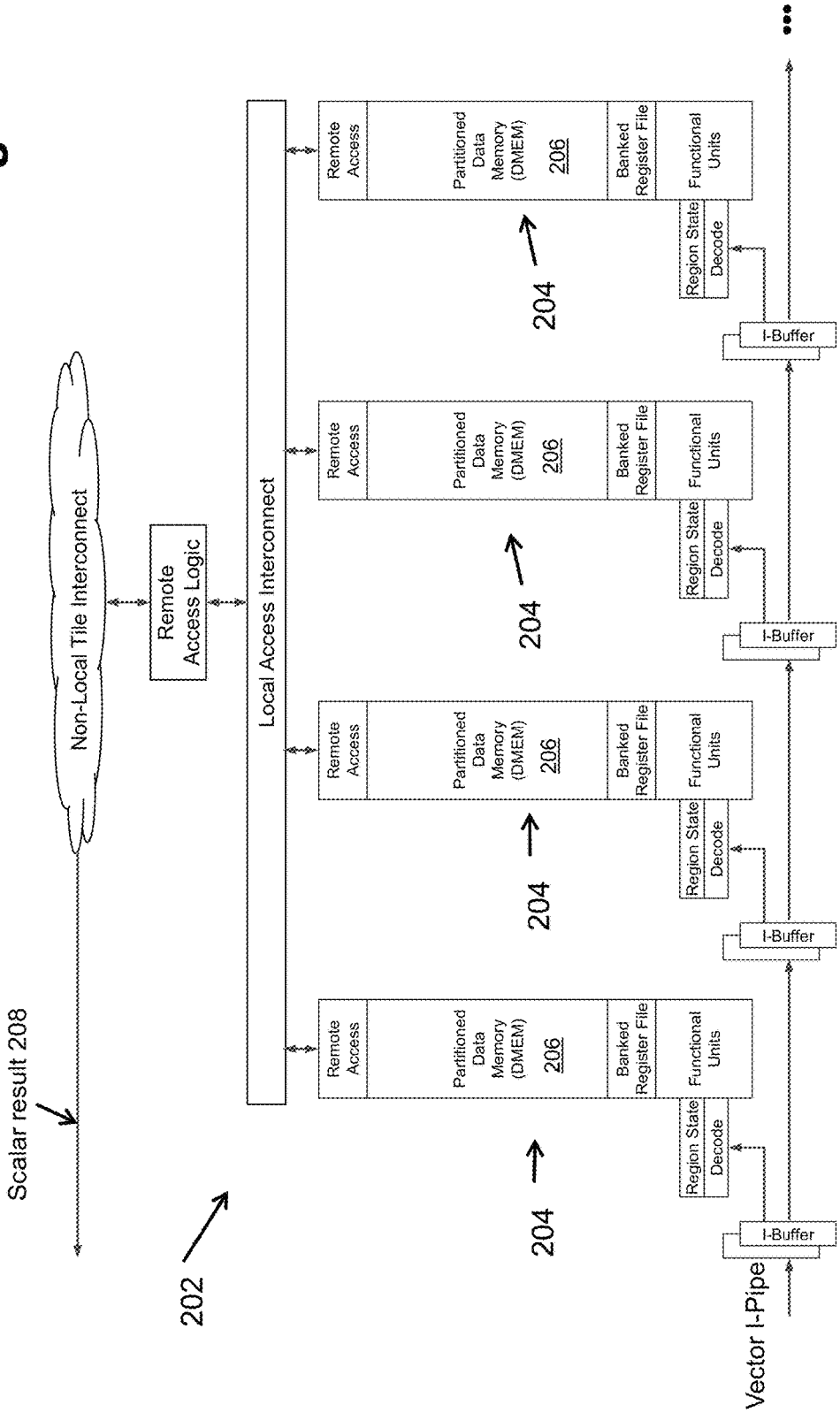
FIG. 2 is a simplified block diagram of an exemplary embodiment of a specialized processor.

FIG. 2 is an exemplary block diagram of a tile array, which is one example of a specialized processor that may be used with the object class library and custom functional unit described herein. Components and operation of a tile array such as that of FIG. 2 are provided in U.S. Pat. No. 9,183,694. More specifically, each of the identical interconnected processing units 204 of FIG. 2 may be referred to as an individual tile processor, with the group of tile processors interconnected and working together to form a tile processing system 202. In an embodiment, the IGU described herein, along with registers, memory, and other components of the host processor, implements the instruction fetching and sequencing operations of a "master processor" described in the above-referenced patent.

In the embodiment of the tile processing system of FIG. 2, data upon which operations are performed is stored in the collective partitioned data memories 206 of the tile processors. For example, "tile" as used herein refers to a rectilinear region, or two-dimensional array, of pixels (or other two-dimensional data). Each processing element, or tile processor, operates on a unique tile of pixels, with adjacent tiles mapped to data memories of adjacent tile processors. The multivalued operands used for these operands are defined as objects in the tile processing architecture, and identified using "object trackers." In this embodiment, therefore, the object trackers included in instructions generated by the host compiler may reference data stored in the tile processor data memories. By contrast to operations on multi-valued operands (such as arrays of data) producing multi-valued results, other operations might produce a scalar result, such as an operation to find the average of all values in an array. In an embodiment, this type of scalar result is not readily stored in tile processor data memories such as those of FIG. 2. Such a scalar result may be sent through the tile processor interconnect structure back to the instruction generation unit for storage at the host processor, as illustrated by "scalar result" line 208.

In addition to identifying operands and operations to be performed, the instructions generated by the IGU for the specialized processor may include other parameters useful to the specialized processor. In the example of a tile processing system, useful information that could be passed using specified bits in an instruction include information on whether the instruction is associated with a "task boundary" as defined in U.S. Pat. No. 9,183,694. Other useful information that may be passed in an instruction to a tile processor is information identifying "use" and "define" numbers for the instruction, as described in FIG. 20 and the associated text of the above-referenced patent. Such information can be used by a tile processor to maintain data coherency. Other types of specialized processors may employ different kinds of specialized information that could be passed to the processor in a specialized instruction created by the IGU.

FIG. 2 shows a subset of the tile array—in this case four tile paths local to each other. Tile paths don't execute the same instruction synchronously, though they do execute the same instruction sequence. Instructions are distributed in both time and space: in time, because an instruction is repeated on the same tile path in a number of different task intervals, each interval representing a different adjacent position in an image; and in space, because instructions are also streamed (copied) from one tile path to the next across any number of tile paths, using an instruction pipeline.

All clocking is local to a tile path, and there is no global stall signal. Stalls are implemented by interrupting instruction pipelining between tile paths, using skid buffers to stall upstream instructions at a rate of one tile path per cycle. This form of instruction distribution and execution also permits fine-grained sharing of data between tile paths, without requiring global mechanisms.

The tile-array implementation has a number of implementation advantages compared to SIMD/SMP organizations:

Tile paths don't require wide RAMs for register files and DMEM. They are no different than typical 32-bit (or 16-bit) datapaths, whereas SIMDs require the equivalent of up to 2048-bit-wide RAMs, assuming 64, 32-bit datapaths.

Accessing local neighborhoods of pixels doesn't require large multiplexing structures. The requirement to access pixels to the left and right of a given position typically limits SIMDs to 2-3 pixels on either side, due to the overhead of multiplexing RAM outputs across a large number of datapaths. Tile paths have no limitation on the scope of this access, using interconnect that is orders-of-magnitude less complex even though tile paths are effectively fully interconnected.

Tile paths are more energy-efficient, because they are dynamically allocated with the granularity of a single pixel, whereas SIMDs are allocated in units of 32 or 64 pixels. This allocation is on an instruction-by-instruction basis, so, for example, an operation on a 1024-wide vector can use 256 tile paths, and be immediately followed by an operation on a 512-wide vector using only 128 tile paths, with the other 128 paths de-clocked.

The unit of interconnect transfer is a scalar, and at the system level is a stream of scalars. SIMDs generally require vector-level interconnect, e.g. a cross-bar of the width of the SIMD, and require that system-level data is aggregated into vectors, possibly with pixel interleaving and de-interleaving, before transfer to a SIMD. This not only makes the system interconnect more complex in comparison, but introduces delays in processing. A single tile path can proceed as soon as it receives a scalar input, independent of other tile paths. There is no explicit pixel interleaving or de-interleaving because vectors aren't exposed at the system level. Instead, pixel formats are determined by how programs are written to assemble abstract vectors, from scalars, in the tile arrays.

A stall doesn't make all datapaths idle in the same cycle. Instead, tile paths detect stall conditions independently, and propagate stall conditions on successive cycles through the instruction pipeline. Using an extreme case as an example, 64 tile paths can resolve 64 independent stall conditions with a single cycle lost due to the stall. In practice, the total number of stall conditions detected across all paths is significantly higher than the total number of cycles required to resolve the stalls—often a factor of 2-3 or more. This results in a fairly high instruction-per-cycle (IPC) rate despite a large amount of potential system-level contention.

This final point deserves emphasis, because there is a counter-intuitive effect with respect to most parallel systems. A fundamental attribute of extant parallel systems is that communication and synchronization cause stalls that increase with an increasing number of cores, over and above the overhead of the basic mechanisms required (such as the cycles to set and test semaphores). This normally is a severe limitation to parallelism, except in applications where the processing workload is large compared to communication/synchronization requirements, an attribute that doesn't apply to visual processing because communication/synchronization is required instruction-by-instruction, across 100's or 1000's of pixels, and with very little predictability in communication/synchronization frequency or dependency topology across all applications.

A tile array, in contrast, requires no additional cycles for communication and synchronization, because these mechanisms are folded into single-cycle load and store operations—single-cycle even with a relatively high interconnect latency of dozens of cycles. The stall mechanism not only benefits from parallel resolution of stall conditions, but also leads to a constructive benefit as tile paths are added. As an example, the scale-invariant feature transform (SIFT) application for CIF resolution uses 88 tile paths, and executes 4.3M instructions in 5.3M cycles, for an IPC of 0.81 per tile path (70 sustained for all paths). The total number of stall conditions is 4.4M in this configuration, which normally would suggest a much lower IPC: performance is lower by 1.0M cycles to resolve these 4.4M stalls, instead of the expected 4.4M cycles.

Moreover, an HD-1080 configuration can use up to 960 tile paths, and executes 16M instructions in 25M cycles, an IPC of 0.64 per tile path (607 sustained for all paths). The total number of stall conditions is 282M—over 17× the number of instructions. Adding more tile paths has added more stall conditions, as expected, but the fact that they are resolved in parallel greatly reduces the performance impact, meaning that a large number of tile paths can be used constructively.

Instruction Generation

Instruction generation for the tile array uses a unique mechanism, adapted to any appropriate local host ISA. It requires very little modification to existing software toolchains for the ISA (in some sense none), as long as the toolchain is based on C++ or an object oriented language with comparable features. As such, it is an extension of the host ISA, a set of instructions collectively called visual-processing extensions (VPX) herein.

VPX is based on the notion of custom instructions, using in an embodiment Gnu Compiler Collection ("GCC")_built-in_custom macros. These macros cause the compiler to emit a pre-defined instruction, with the macro defining the op code (typically using an enumeration) and two operands, either immediates or variables (which are allocated to registers). Variables have types of either integer, floating-point, or void pointers (the latter to permit memory access). Instructions can be defined to return a result, which is assigned to another variable. Since there is a result, the instructions are three-operand, non-destructive instructions.

The compiler isn't necessarily aware of the function performed by the custom instruction (though it can be, typically using some kind of abstract machine description). It simply manages the variables/immediates used and handles the result, with the instruction participating in register allocation, procedure linkage, etc. as any other instruction. This permits tile-array instructions to be ultimately emitted by the compiler without any requirement that the compiler be exposed to details of the underlying tile paths nor their instruction encoding. This attribute of custom instructions is used to compile code for the tile array with much flexibility, but no complexity in the toolchain, and no requirement for the toolchain to understand the semantics of tile-path instructions.

The fact that the compiler need not be aware of the functionality of instructions is what permits VPX instructions to be virtual. They don't encode functionality directly, as instructions typically do, but rather encode information that is used by the IGU to generate and issue instructions to the tile array. In a sense, the IGU is a hardware compiler for VPX, except that is it not as general as a software compiler—for example not having to deal with branches or procedure linkage. This lack of generality actually is a strength, because, for example, the changes in control flow caused by branches usually limits the effectiveness of register allocation in software compilers. The IGU can be much more effective in allocating registers, using for example 1024 registers or more, whereas most compilers can't effectively allocate more than 32 registers.

Virtualized Programming Model

In an embodiment, applications for the tile array are based on a C++ class library. This class library implements the functionality of the virtual tile array, in two different forms. The first form is implemented purely in software, with fully equivalent function to the tile array, but much slower because it doesn't execute on hardware. The second form simply issues VPX instructions in-line, with no procedure-call overhead to the class library, with the effect of single-cycle execution, possibly in parallel, in a superscalar pipeline, with other host instructions.

There are three different build options for the class library using these two forms of virtualization, selected by compiler flags: 1) for prototyping independent of the tile-array implementation, using software-only emulation of the class library; 2) for generating instructions for the tile-array target, with minimum software overhead; and 3) a hybrid version that implements both software emulation and tile-array custom instructions, used for co-simulation and verification. The hardware-only version (2) is described below.

To start, consider the declaration of three integer Data Vectors, a, b, and c with a defined width for a and b (the width isn't necessarily defined in the declaration; a vector can inherit a width on assignment, which applies for c). This is followed later in the program by a statement that adds a and b and assigns the result to c.

DataVector<int> a(width), b(width), c;
   . . .
   c=a+b;

When the compiler encounters the declarations of a, b, and c, it calls object constructors that are defined by the library. These constructors contain one or two custom instructions (in the version of the library being described here), and the object contains only a single variable, referred to as an object tracker. The custom instruction encodes attributes of the objects, such as datatype and width. With the exception of width, this information is provided by compile-time constants, and, if the width is in a register, the constructor call can be a single-cycle, inline instruction, so it has minimum overhead.

The constructor custom instruction returns a result, which is assigned to the object tracker. This object tracker is used in subsequent operations on the object variable, and is handled as any other object variable would be. For example, the overloaded add in the above example generates a single custom instruction that has as its two operands the object trackers for a and b, and returns as its result a temporary object tracker for the result of the add. To assign this to c, the compiler simply copies (or propagates) this object tracker to become the object tracker for c.

This permits the compiler to handle very large visual objects as if they were any other variable—including allocating to registers, participating in procedure linkage, being dynamically allocated, etc.—without requiring that the compiler have a machine description for the object, its behavior, nor the definition of tile-path instructions. This is critical because, as will be seen, the definition and execution of tile-path instructions is unlike any other architecture. The tile-path instructions can be defined for the benefit of the tile paths and arrays, without restrictions imposed by the toolchain, such as instruction width, limitations of datatypes, etc. It also permits very different tile-path and tile-array implementations to be binary compatible with each other.

IGU Overview

Figure 3:
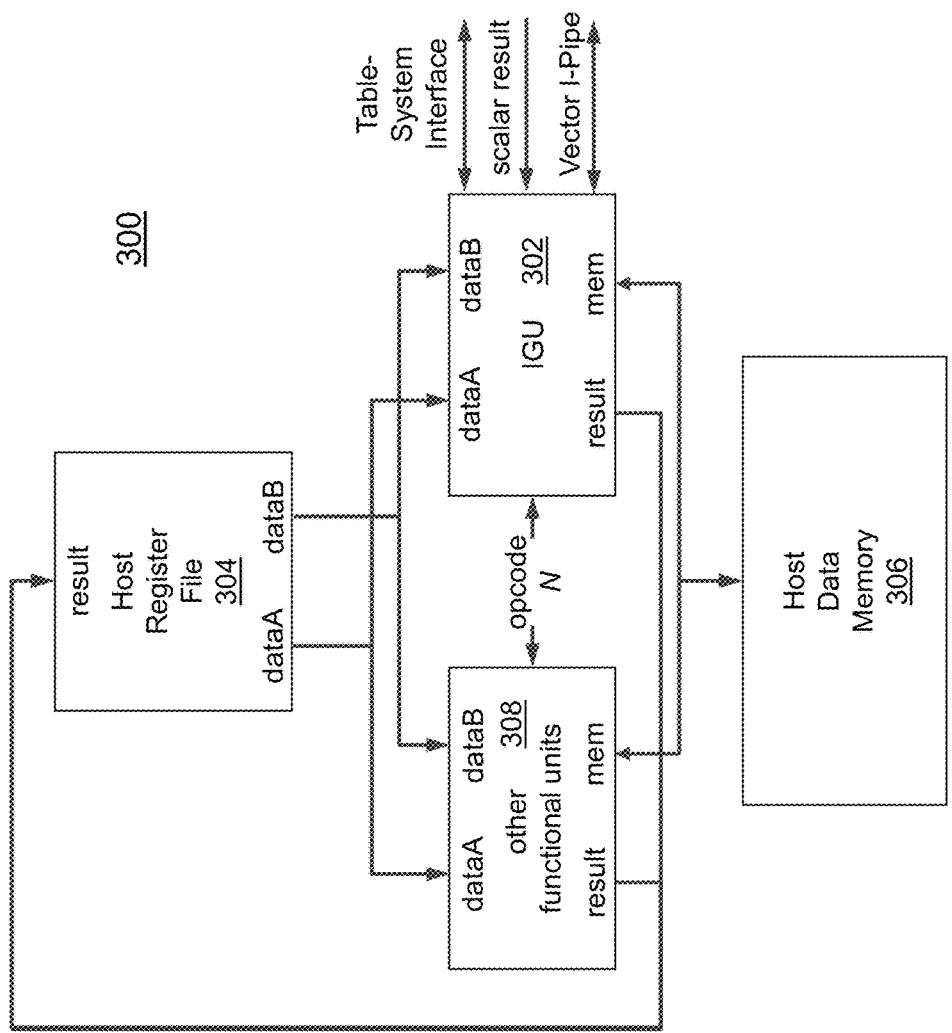
FIG. 3 is a simplified block diagram illustrating an exemplary implementation of an instruction generation unit with a host computer.

FIG. 3 is a simplified block diagram of an exemplary embodiment of a host computer 300 that may be employed in implementing the systems and methods described herein. In addition to the components specifically illustrated in FIG. 3, the host computer includes the components of a conventional computer (such as, for example, power supplies and provision for connection to a power source) interconnected in the manner of a conventional computer as understood by one skilled in the art. In an embodiment, a program compiled by a conventional compiler using an object class library as described herein is executed by a host computer such as that of FIG. 3. At a general level, components of FIG. 3 other than the IGU 302 in the middle right portion of the diagram are components that may also be found in a conventional processor.

In an embodiment, the host processor executes instructions involving operands dataA and dataB shown in FIG. 3. In a further embodiment, the instructions executed by the host processor are 32-bit instructions. For some of the instructions, operands dataA and dataB may represent numbers or variables of a conventional form, and the instruction is executable conventionally using the native instruction set of the host processor. In an embodiment, such instructions are executed using a processor represented by the host register file 304, host data memory 306 and "other functional units" 308 shown in FIG. 3, without the use of the IGU of FIG. 3. Other instructions executed by the host processor of FIG. 3 are custom instructions generated by the compiler using a custom instruction macro within the object class library, as described above. Such instructions are handled by the IGU.

The IGU of FIG. 3 (which may also be referred to herein as a "custom functional unit" or an "hardware instruction compiler") is programmed to recognize the values of the operands dataA and dataB used by the compiler-generated custom instruction. Using the operands and opcode from the custom instruction, the hardware instruction compiler generates the appropriate instruction or instructions for a specialized processor coupled to the IGU. In the embodiment of FIG. 3, the IGU is coupled to the specialized processor through sending of instructions from the IGU to the specialized processor using instruction pipeline I-Pipe and receiving of one or more scalar results from the specialized processor. From the perspective of the specialized processor, the IGU is an "instruction generation unit," because it can include additional operations such as sequencing and multitasking the instructions for the specialized processor.

Examples of custom instructions that may be handled using the IGU are illustrated by the two exemplary Tile Processor Host Custom Instruction Set Architecture Tables (hereinafter "Custom ISA Tables") provided below. The tables below define some of the custom instructions that may be generated by a compiler and provided to the IGU of FIG. 1 in an exemplary embodiment. Multiple other types of instructions, such as shift instructions, Boolean instructions, and move instructions, would also be included in a practical implementation. Information in the Custom ISA Tables may be included in one or more files within the object class library that are accessed by the compiler to implement user-defined functions. Use of such information allows the compiler to generate custom instructions including operands such as dataA and dataB and an opcode corresponding to the desired operation. In an embodiment, the custom instructions are 32-bit instructions.

TABLE 1

| Constructor, Destructor, Resize | | | | |
|---|---|---|---|---|
| Mnem | dataA | dataB | Result | Type |
| CONSTRUCT | Bndry/Qual/ Height/Base | ObjType/ OpExt/Width | objTracker | inii |
| DESTRUCT | objTracker | | | nii |

TABLE 1-continued

| Constructor, Destructor, Resize | | | | |
|---|---|---|---|---|
| Mnem | dataA | dataB | Result | Type |
| COPY_CONSTRUCT | objTracker | | objTracker | inii |
| COPY_CONVERT | objTracker | DestType | objTracker | inii |
| RESIZE | objTracker | Width | | nii |

TABLE 2

| Arithmetic (DataVector) | | | | |
|---|---|---|---|---|
| Mnem | dataA | dataB | Result | Type |
| ADD | objTracker | objTracker | objTracker | inii |
| ADD_IMM | objTracker | literal | objTracker | init |
| SUB | objTracker | objTracker | objTracker | inii |
| SUB_IMM | objTracker | literal | objTracker | init |
| SUB_FROM_IMM | objTracker | literal | objTracker | init |
| ABS | objTracker | | objTracker | init |
| MUL | objTracker | objTracker | objTracker | inii |
| MUL_IMM | objTracker | literal | objTracker | init |
| DIV | objTracker | objTracker | objTracker | inii |
| DIV_IMM | objTracker | literal | objTracker | init |
| DIV_IMM_BY | objTracker | literal | objTracker | init |

Depending on the nature of the specialized processor, operands such as dataA and dataB may represent multiple data values. For example, an operand for the tile processor of U.S. Pat. No. 9,183,694 referenced above may represent a two-dimensional array of data. In the example of the Custom ISA Tables, such variables having a custom, multivalued format are defined as objects and identified using "object trackers" ("objTracker"). Certain custom instructions, such as the CONSTRUCT instruction in Table 1 of the Custom ISA Tables, may be used to create, and assign properties to, an object corresponding to a particular variable. Other custom instructions are used in performing operations using variables identified by object trackers. For example, the ADD instruction in Table 2 of the Custom ISA Tables specifies that the data identified by the object tracker for operand dataA is added to the data identified by the object tracker for operand dataB, with the result stored in the memory locations associated with the object tracker for the result. In an embodiment, the data associated with one or more of these object trackers is stored in one or more data memories within the specialized processor.

For the example of an IGU designed to interface to an array of tile processors (a "tile array") using the interface defined by the Custom ISA Tables, the IGU creates an add instruction in the form needed by the tile array in response to receiving the ADD instruction from Table 2 of the Custom ISA Tables. In this way, the compiler for the host processor does not need to have information about the instruction format required by the tile processors (or other specialized processor). The host compiler uses the interface to the custom functional unit defined by the files within the object class library that establish user-defined instructions for the host compiler. The hardware instruction compiler is then free to create an instruction for the specialized processor of whatever length and in whatever form is needed by the specialized processor. Development of the specialized processor can be ongoing, with resulting changes to the instruction format needed by the processor, with only the hardware instruction compiler needing to be modified to accommodate any changes to the specialized processor.

In the embodiment of FIG. 3, the IGU is implemented as a functional unit in the host's datapath; however, instead of directly executing VPX instructions, it interprets them. This functional unit has two input operands and a result bus. For most instructions, this unit appears to have single-cycle execution, because, with respect to the local host, it only receives object trackers (or fixed values) and returns an object tracker. For example, returning to the code example, when the constructor custom-instruction is issued to the IGU, it simply allocates an entry—a descriptor—into an attribute table, using stack-based allocation, and returns the address of the table entry (the object tracker) while it fills in information for the object, such as datatype and width. For objects that require shared DMEM in the tile paths, it also allocates the required memory, assigning a base address to the object that will be used for tile-path instruction generation. Also, for objects that contain other control state, such as circular buffers, this state is initialized.

For other instructions, such as the add in the earlier example, the IGU accesses the attribute-table entries, generates the appropriate form of tile-path ADD instruction, and issues to the tile array. Further details of the IGU are presented below, but a few highlights are:

- All control, sequencing, and coherency operations are performed by the IGU. It adheres to a sequential execution model, so, for example, memory writes always precede reads of the same location, and all reads are executed before a subsequent write. Execution in the tile arrays is massively out-of-order, but the equivalent of sequential ordering is maintained using information provided in the tile-path instructions that is based on the sequential-execution model.
- The operation of the system interface and global tables is managed by the IGU, for example providing base addresses and access widths independently of the tile paths. These operations are completely outside of the tile paths, which simply execute the load, store, and histogram operations and provide local offsets and data without being involved in any of the global details.
- The IGU performs all register and memory allocation for the tile paths, including register spill/fill and allocating accumulators (optionally) to compound multiply-add operations. This allocation is comparable to—and as general as—conventional compiler allocation for the cases it has to handle, and in fact is more effective because there are no branches or procedure calls in the custom-instruction stream, and no need for explicit procedure linkage. Any object that is spilled is allocated a DMEM location, but this location is allocated only if a spill is required. With a sufficient number of registers (256 per pixel position typically), spills are very rare, and fills even more rare because the object can be destructed by a procedure return (or delete) and not used again.
- The IGU manages shared data in a way that ensures coherency. For example, shared data is not allocated to registers except during temporary evaluation, because registers are not sharable between tile paths.
- Instructions use type tagging, so that a single operation can be defined for any number of datatypes. For example, signed/unsigned integer and floating-point adds are identical except for the field identifying the datatype. This can be expanded to include user-defined types such as fixed-point, assuming that the tile paths are designed to support the underlying operations.

Implementation Overview

Figure 4:
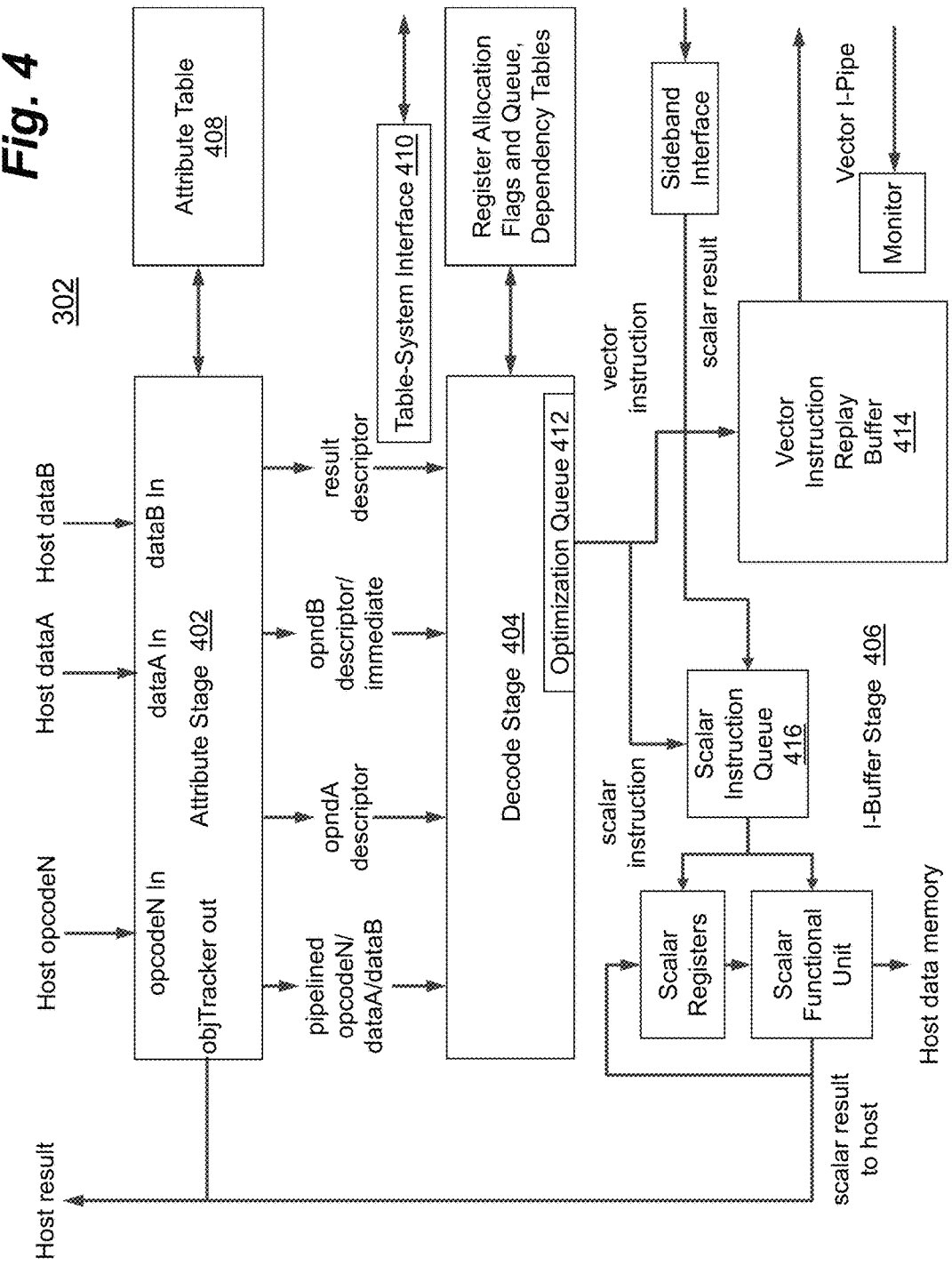
FIG. 4 is a simplified block diagram illustrating an embodiment of an instruction generation unit.

FIG. 4 is an exemplary block diagram illustrating organization and operation of IGU 302 of FIG. 3. As described above, the IGU is implemented as a functional unit in the host's datapath; however, instead of directly executing VPX instructions, it interprets them. This functional unit has a typical configuration in that it has two input operands—Host dataA and Host dataB—and returns a single result—Host result. Host dataA nearly always contains an object tracker: the exception is that it can contain object parameters for constructor instructions. Host dataB, if present, contains either another object tracker, a fixed value (immediate), or constructor information. The Host result, if defined by the instruction, is normally an object tracker for the result of the instruction, allocated by the IGU. However, it can also be a scalar value in a VectorSummary object returned to the host.

The implementation of the IGU is distributed over three pipeline stages, corresponding to the upper, middle, and lower portions of the figure: the Attribute Stage 402, the Decode Stage 404, and the I-Buffer Stage 406. The following sections provide an overview of the operation of each of these stages. Following this overview, subsequent sections describe in detail the operation of each stage.

Attribute Stage Overview

The Attribute Stage implements the main interface to the host processor, receiving VPX opcode and dataA and dataB operands, and returning the object tracker result. Its primary functions are to: 1) enter object descriptors into the attribute table to implement constructor instructions, 2) to update these descriptors as required by instruction execution, 3) to delete the descriptors to implement destructor instructions, and 4) to assemble information required by the Decode Stage to covert the VPX instructions into tile-path instructions. It outputs this information to the Decode Stage.

When the attribute stage receives a constructor instruction, it allocates the next entry in the attribute table 408, and enters descriptor information based on parameters contained in the instruction. It also enters information based on local parameters, for example allocating tile-path DMEM for LineBuffer objects that implement circular buffers of shared data: these require a number of DMEM lines to implement the buffer, based on its size. It returns as the instruction result the address of the attribute-table entry; this is the object tracker used by the host for subsequent operation on the object. A few objects require two instructions to convey all constructor parameters, and in this case the object tracker is returned for the second instruction.

Instruction execution often requires creating descriptors for instruction results, or modifying existing descriptors to reflect object state changes implied by the instructions. For example: 1) adding two objects results in a new object whose descriptor reflects the input operands, 2) assigning a LineBuffer variable requires updating the state of the circular buffer implemented by the variable, and 3) assigning a DataVector object can change the width of the object. In these cases, the Attribute Stage creates a new descriptor and returns the object tracker to the host, or updates descriptors in the attribute table at locations defined by the object trackers in the instruction.

The primary outputs to the Decode Stage are a pipelined version of the original VPX instruction, and other information related to the two input operands and the result. The dataA operand in this case is converted to a descriptor of the operand instead of the object tracker. The dataB operand is either a descriptor of the operand or a fixed operand value with an indication of its datatype (for variables, the datatype is contained in the descriptor). These descriptors can be modified relative to the attribute table, in advance of modifying the attribute table. A descriptor for the result, created by the Attribute Stage, is also conveyed to the Decode Stage.

Decode Stage Overview

The decode stage of the IGU, shown in the center of the diagram of FIG. 4, receives instruction and attribute information from the attribute stage, and handles allocation and de-allocation of registers using register allocation flags and a register allocation queue. The decode stage also forms the instruction for the specialized processor and passes the instruction to the instruction buffer stage. The Decode Stage converts sequences of VPX instructions into functionally-equivalent sequences of tile-path instructions. At a high level, this simply converts instructions in one format, a VPX add for example, into another format, a tile-path add. However, is also involves register allocation, register spill/fill including DMEM allocation for spill/fill locations, and annotating instructions with dependency information. The Decode Stage also implements the control interface to the Table-System Unit 114 shown in FIG. 1, which also involves tracking and managing dependencies on system and table accesses.

Register allocation is performed as a result of constructor instructions for objects that can be contained in a register. This excludes objects that contain shared data, since registers cannot be shared. Register allocation uses two structures: a "free list" containing the identifiers of registers that haven't been allocated, and an "allocation FIFO" containing a list of register that have been allocated, in the order of allocation. The free list doesn't require ordering, but the allocation list is kept in order so that, if a register is required, the hardware can select the register that was least-recently allocated, because this register is less likely to be needed in the near future.

During operation, a construct operation might require a register when none is available. In this case, the Decode Stage allocates a memory location for the spill, using a stack that grows from the highest-address DMEM location to lower addresses, and issues a spill instruction. A subsequent operation might operate on a register that has been spilled, in which case another register is allocated for the fill operation—this allocation in turn might result in another spill. An operation might also have a temporary result that requires a new register, which also might result in a spill. Despite the fact that there are multiple allocations, resulting in multiple spill and fill conditions, register allocation eventually reaches a state where required registers have been allocated and any spilled registers have been placed in DMEM.

The Decode Stage also adds dependency information to instructions that write and read shared data. This information permits the tile paths to coordinate in implementing a sequential-execution model even though the actual instruction execution is out-of-order in space and time. This uses two tables to store information related to access of shared data. One table holds, for each DMEM location, an identifier of the instruction that most recently wrote the location: any operation that reads this data requires that instruction has been executed in the target memory. The other table holds, again for each DMEM location, an identifier of the instruction that most recently read the location: all tile paths must have completed this read before a subsequent write is allowed.

The control interface to the Table-System Unit implemented by the Decode Stage, Table-System Interface 410, is used to communicate global information to this unit. This includes a table or system base address, for a read or write, that applies to all tile paths—the tile paths provide only the offsets from this address. It also indicates whether the operation is a read or write, and, for table writes that are histogram operations, the type of histogram operation. Finally, the Decode Stage provides information that uniquely identifies the access within a given span of time, including unique identifiers for both a particular access and for the object being accessed (using the object tracker).

There can be multiple table and system accesses in process at any given time, because these operations are distributed over the tile array. Separate access streams are tracked using request queues: there are separate request queues for table and system accesses. The access instructions issued to the tile paths contain a queue identifier, and the instruction encodes whether the access is for a table or the system. Thus, multiple access can be in progress, identified by queue entry for individual accesses.

When all accesses have completed, Table-System Unit 114 returns an indication to the Decode Stage, indicating that the corresponding queue entry is free. This indication also includes the object tracker that was originally provided by the Decode Stage. This identifier is used by the Decode Stage to provide read-write synchronization on objects. For example, the Decode Stage holds back a table write when there is a read in progress for the same table. The table write is allowed to proceed when the Table-System Unit signals that the read has completed across all tile paths.

The Table-System interface 410 also implements a global barrier that permits system-level synchronization with the tile array. This ensures that all table and system access have completed before the barrier operation is allowed to complete.

Finally, the Decode Stage includes an optimization queue 412 for locally optimizing the instruction sequences. For example, this queue can combine stores into preceding instructions, so that the instruction can have a side-effect of writing DMEM without an additional cycle. It also can convert sequences of multiply and adds into compound multiply-add instructions that take a single cycle to execute, instead of two separate cycles for the multiple and add (or add and multiply).

The output of the Decode Stage is a decoded instruction for the I-Buffer stage.

I-Buffer Stage Overview

The I-buffer stage of the hardware instruction compiler, shown at the bottom of the diagram of FIG. 4, includes scalar registers and a scalar functional unit for receiving scalar data from the specialized processor, operating on scalar data with other scalar operands provided by the host processor, and storing scalar results. The I-buffer stage also includes an optimization queue and an instruction replay buffer for managing execution of instructions by the specialized processor. In an embodiment having a tile array as the specialized processor, the I-buffer stage implements the instruction fetching and sequencing operations of a "master processor" described in U.S. Pat. No. 9,183,614. In such an embodiment with a tile processor as the specialized processor, the I-Buffer Stage receives instructions from the optimization queue in the Decode Stage and manages two instruction buffers: one for vector instructions (Vector Instruction Replay Buffer 414), and the other for scalar instructions (Scalar Instruction Queue 416). Vector instructions are executed by the tile paths, and the I-Buffer Stage manages the sequencing of instructions into the vector I-pipe. Scalar instructions are directly executed by the IGU, except that some of these involve a scalar that is produced by an intra-vector operation, for example an operation that produces the maximum value in a vector. The latter instructions are placed on both the vector and scalar buffers in order to synchronize the scalar result with the vector operation.

The vector and scalar instruction buffers serve different purposes. Vector instructions require sequencing over multiple task intervals, each task interval representing operation at a specific location in each tile path. Task intervals are defined by access to shared data, because multi-tasking is the basis for avoiding latency penalties for communicating this data, and for resolving dependencies between writes and reads of the data. However, task intervals are also defined to cover latency of table and system accesses, and to mark the end of an instruction sequence in the buffer, so that instructions can be issued regardless of the state of instructions received from the Decode Stage, and, ultimately, the host. The latter point illustrates another benefit of the instruction buffer—it allows the performance of the tile array to be decoupled from the instantaneous bandwidth of VPX instructions from the host. Only the average bandwidth over a span of time is necessary to keep the tile array executing at its peak rate.

The scalar instruction buffer synchronizes scalar operations to vector operations. Scalar operations usually have large latency, because the scalars require processing across entire vectors, meaning that all instructions that produce a scalar must execute in all tile paths and all local locations (regions) within the tile paths. The class library implements VectorSummary objects to permit programs to decouple this latency from host execution: scalar results are placed into VectorSummary objects to be accessed at any time by the host, instead of requiring that the host wait for the scalar to be produced. Since vectors can have any width, this latency is variable depending on the width of a particular variable, so scalars are produced without any natural ordering of results with respect to each other or with respect to any operation on VectorSummary objects (such as adding two scalar values). The scalar instruction buffer is implemented as a queue 416, keeping operations in their original order. When the I-Buffer issues an intra-vector instruction that produces a scalar result, the instruction identifies the queue entry that is to receive the result.

The I-Buffer stage processes sideband information embedded in packets that are transmitted on the global interconnect. One of these is transmitted upon completion of a read to shared data at the last vector element that is read. This indicates that a write to the data is enabled. There can be multiple read operations for a given write, and this indication enables a write only if it is associated with the most recent read, as tracked by the IGU. Another of these sideband signals is transmitted by the last tile path to perform an intra-vector operation that results in a scalar, because only after all vector elements have been processed can the scalar result be produced. This scalar result is placed into the scalar instruction queue to be properly ordered with other scalar operations.

Finally, the I-Buffer is connected to the I-pipe output of the last tile path in the instruction pipeline. This permits the IGU to detect when there has been a disruption in the I-pipe, such as an infinite stall condition. This allows the implementation of a timer that can signal such a condition, which represents an error, and facilitate recovery. It also implements the barrier operation, mentioned earlier, with respect to the tile paths. The I-Buffer issues a barrier operation into the I-pipe, and detects that all tile paths have completed when this instruction is detected at the end of the I-pipe.

Attribute Stage Detailed Operation

Figure 5:
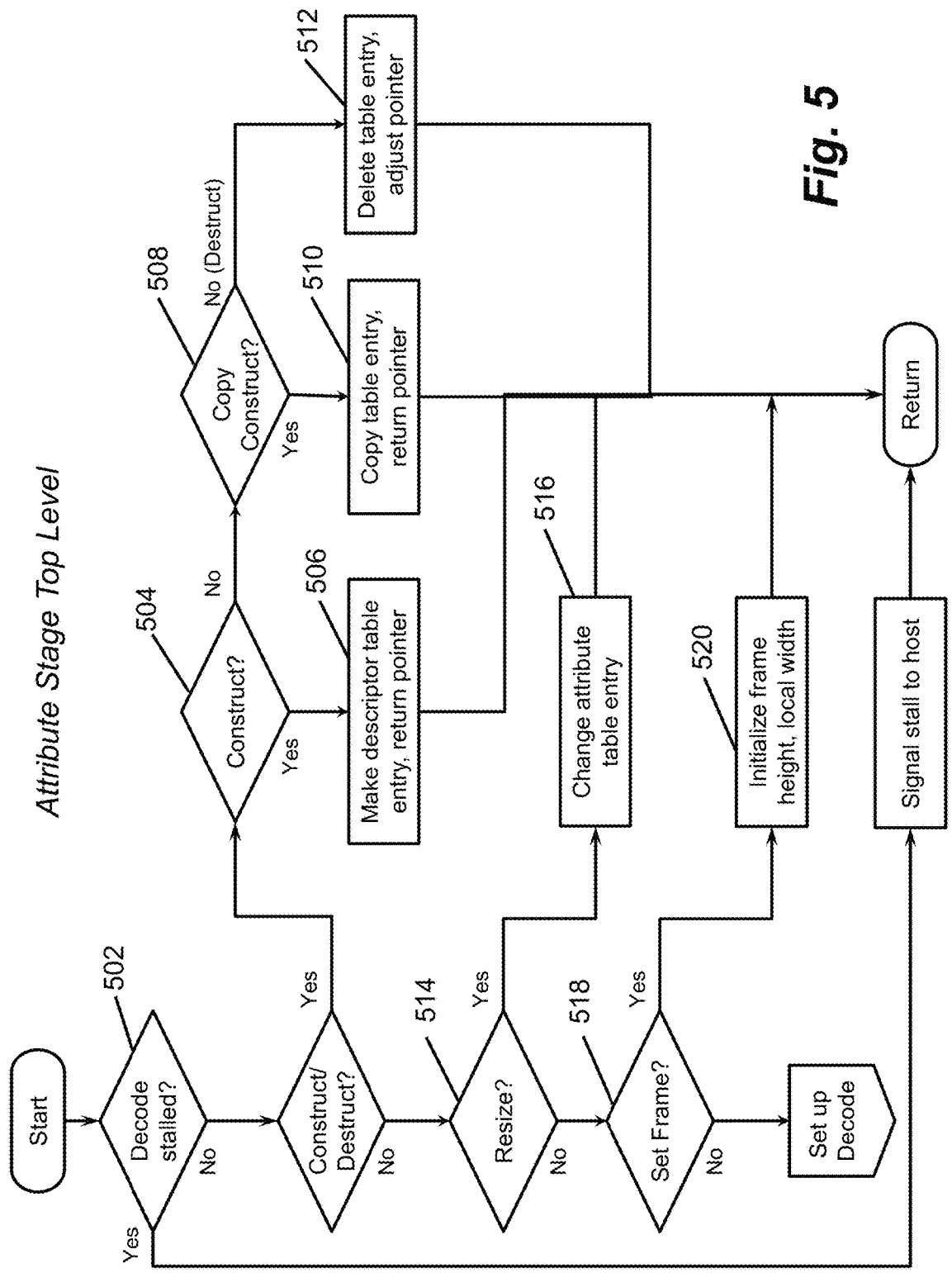
FIG. 5 is a flowchart illustrating an embodiment of a process carried out by an instruction generation unit described herein.
Figure 6:
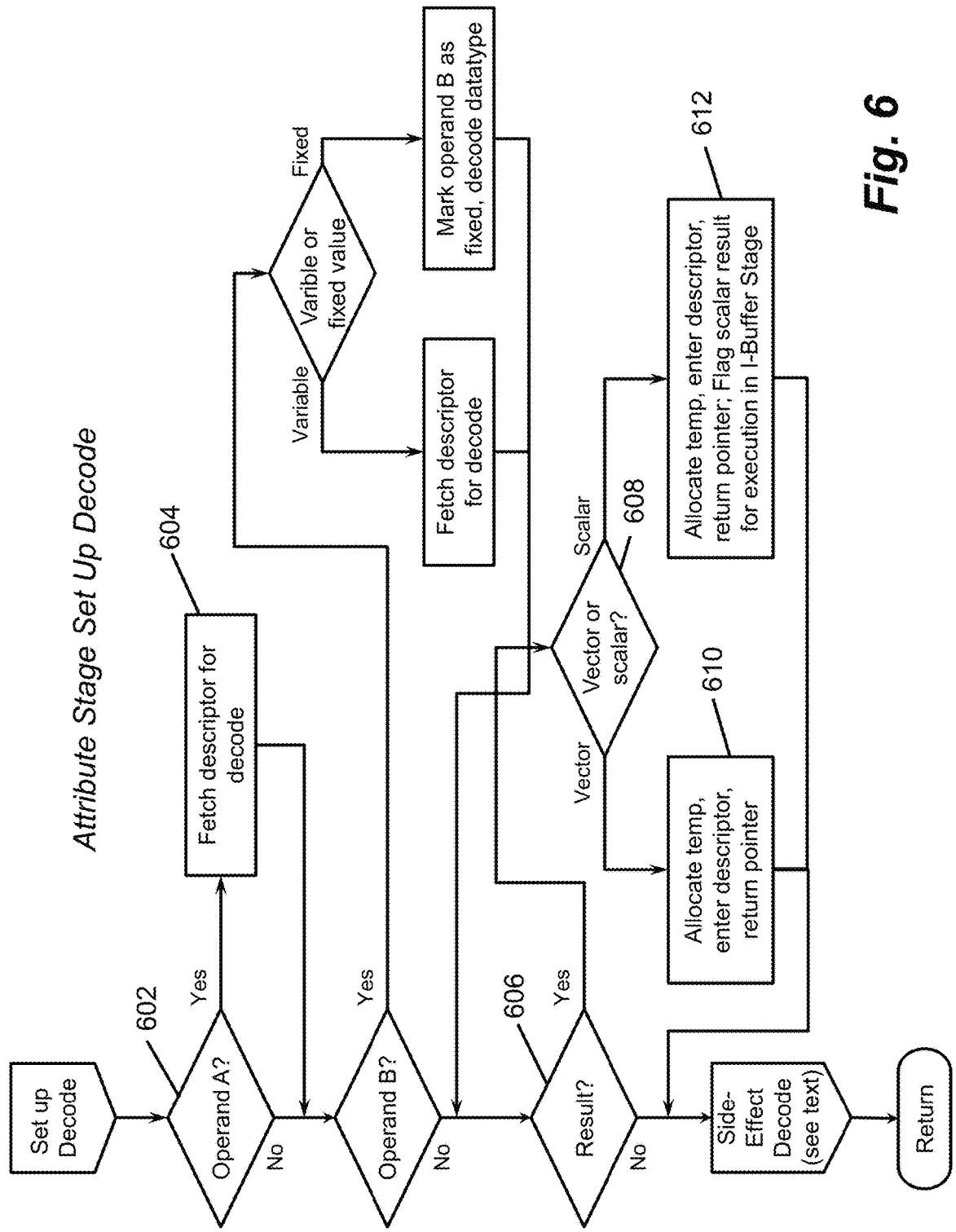
FIG. 6 is a flowchart illustrating an embodiment of a process carried out by an instruction generation unit described herein.

FIG. 5 and FIG. 6 show the top-level flow diagram of the operation of the Attribute Stage. This stage operates only if the Decode Stage is not in a stalled state (step 502), so that it can receive information from the Attribute Stage (this indication also can reflect whether the I-Buffer Stage is in a state to receive an instruction from the Decode Stage). The primary operations at this level are to respond to instructions that directly affect the state of the attribute table (FIG. 5), and to set up operands for the Decode Stage (FIG. 6).

There are four instructions that directly affect descriptors in the attribute table. The construct instruction (step 504) creates a new object, with a new descriptor in the table (step 506). The copy construct instruction (step 508) creates a new object, using the settings of an existing object and copying its values into the new object (step 510): this might involve converting the datatype of the existing object to the datatype of the new object. The destruct instruction ("no" branch of step 508) deletes an object (step 512) and the resources it is using, such as the attribute-table entry and any allocated DMEM and register. Finally, the resize instruction (step 514) sets a new width for the object vector (step 516). The final instruction in the figure sets global frame parameters (step 518), such as the frame height and region size (step 520), with the region size controlling the number of adjacent vector elements, or pixels, operated on by each tile path.

The second set of operations (FIG. 6) fetch descriptors from the attribute table as required for input operands (steps 602, 604), and create new descriptor entries for instructions that have a result (either a vector or a scalar) (steps 606, 608, 610, 612). The address of the new entry is returned to the host, but this happens in parallel with creating the entry because the address of the entry is known in advance. The descriptor of the new entry is derived from the descriptor(s) of the operand(s). For example, if an floating-point number is added to an integer, the result is a floating-point number: the decode stage will emit a conversion of the integer to a floating-point representation before emitting the add, following the standard conversion and datatype precedence rules defined for C++. As another example, adding a vector to a wider vector results in a vector of the wider width, but with elements changed only as defined by the narrower vector.

Table 3 shows the types of information contained in the descriptor for each type of object. This information is either: 1) accessed directly from the attribute table; 2) created by the Attribute Stage for instruction results; or 3) modified by the Attribute Stage before being conveyed to the Decode Stage, to reflect that a descriptor will be updated by the Attribute Stage as a side-effect of the instruction. This is one aspect of the flowchart connector labeled "side-effect decode" in the figure. There is no flow chart for this set of operations, because it is very detailed and mechanical. However, the following is a general summary of the types of operations required.

TABLE 3

Descriptor Information by Object Type

| Object Type | Descriptor Information |
|---|---|
| Line Buffer | Circular buffer state, memory allocation |
| Data Vector (or Temp) | Width, variable or temp |
| Index | Begin/end position, width, expression parameters |
| Mask | Binary values or position range |
| Table or Histogram | Size, base address, shift/mask parameters |
| System Access | System base address, addressing state |
| Vector Summary (or Temp) | Variable or temp |

LineBuffer reads require enabling or disabling the read depending on the amount of data currently contained in the buffer and the offset of the read. The amount of data in the buffer should be sufficient to satisfy the read at the given offset, including boundary processing. Also, the width of the resulting vector can depend on the width defined for the horizontal and/or vertical offsets. If the buffer has been initialized, its output is immediately available.

Move instructions implement assignment operations, so the descriptor state of the assigned object is modified as required by the move. For example, setting a Data Vector with a wider vector changes its width to be the same as the wider vector. This can also convert temporary objects such as an Index expression into a non-temporary object.

LineBuffer assignments update the circular-addressing state of the buffer, including the base line, the number of valid lines, the new line to be assigned next, and so one. This modifies the descriptor in the attribute table and the descriptor conveyed to the Decode Stage accordingly.

Index objects can have either an undefined width, in which case other considerations such as object width define the width of an access, or a defined width that overrides the object width. If the width is defined, there are cases where this modifies the width of the accessed object—for example for upsampling or downsampling—rather than directly determining the width. This state is defined by expressions that operate on the Index object, so the Attribute Stage must track these expressions and modify the descriptor for the Index accordingly.

If an access is invalid for some reason, for example an access to a LineBuffer object that doesn't yet have sufficient context for the access, the Attribute Stage disables any expression involving this access, up to the point of the next assignment, including disabling the assignment. This greatly simplifies the programming and reuse of certain objects, because they can be used without requiring testing a lot of boundary conditions—the objects are simply silent until the input conditions are met, or are silent after they have reached an ending condition.

Decode Stage Detailed Operation

Figure 7:
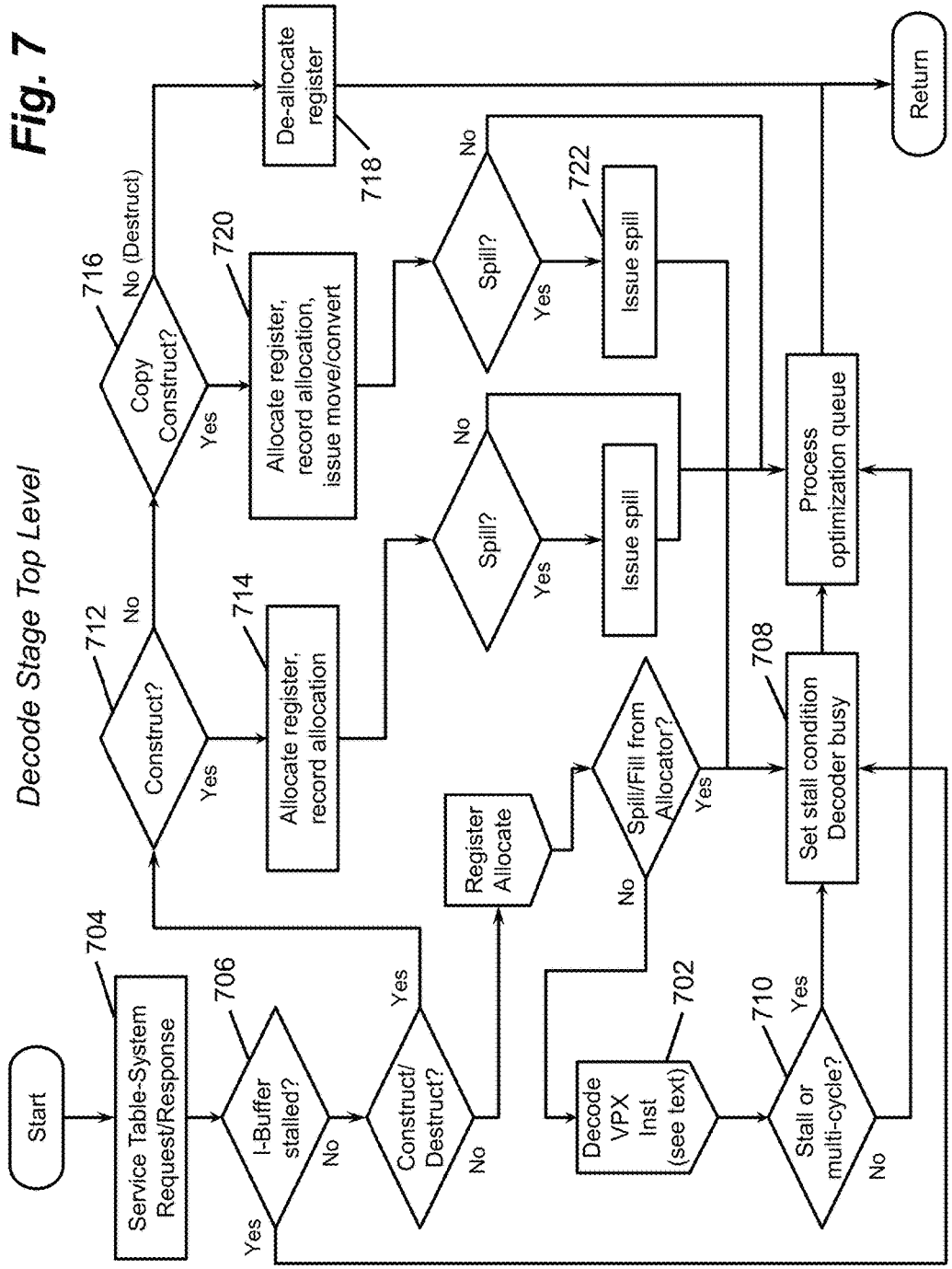
FIG. 7 is a flowchart illustrating an embodiment of a process carried out by an instruction generation unit described herein.
Figure 8:
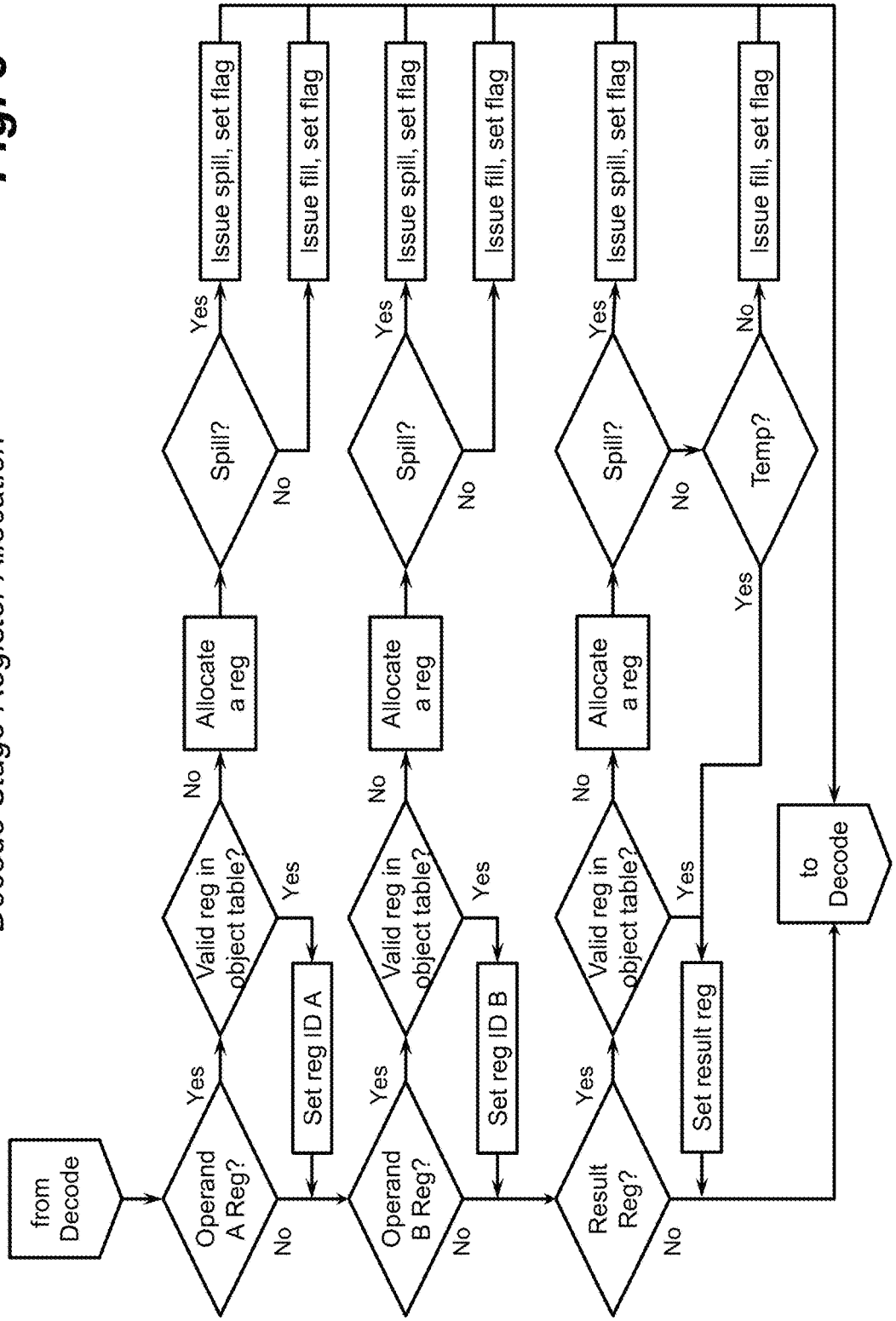
FIG. 8 is a flowchart illustrating an embodiment of a process carried out by an instruction generation unit described herein.

FIG. 7 shows a flow chart for the overall operation of the Decode Stage, including the register-allocation flow chart in FIG. 8 shown as off-page connectors in FIG. 7. The main operation of the decode stage is shown as "Decode VPX Inst" (step 702), which converts sequences of VPX instructions into equivalent sequences of instructions for the specialized processor, such as tile-path instructions. This process is mostly mechanical, and should be apparent to one of ordinary skill in the art of instruction set architectures in view of this disclosure and the instruction set of the specialized processor involved (though note that the VPX instructions are expected to be standard, whereas the tile-path instructions don't have to be fixed, owing to the virtualization implemented by the IGU). The discussion that follows describes the specific set of tasks surrounding this central decode task.

The Decode Stage services the interface to the Table-System Unit (step 704), as described earlier, regardless of whether it is stalled or not. Otherwise, the Decode Stage operates only if the I-Buffer Stage is in a state to receive decoded instructions (step 706), for example the vector instruction buffer has open locations and is not otherwise stalled. The Decode Stage itself can impose stall conditions by preventing the Attribute Stage from supplying new instructions, and by preventing the flow of decoded instructions to the I-Buffer Stage. When the Decode Stage is stalled, due to conditions described later, it doesn't accept new instructions, but instead repeats or continues the previous decode operation (step 708). Decoding is repeated in the case that previous decoding was unsuccessful, and is continued in cases where a single VPX instruction results in multiple tile-path instructions (step 710). An example of the latter is a table access that requires the table address to be shifted and masked before the access can be accomplished.

The first set of operations shown determine whether the input instruction is a construct or destruct operation. Construct instructions (step 712) require register allocation (step 714) for register-based (non-shared) objects, and destruct instructions ("no" branch of step 716) de-allocate any register (step 718) associated with the object. Copy construct (step 716) leaves the allocation of the copied object but allocates a register for the new object and emits a move operation to copy the contents of the copied object in the tile paths (step 720). Register allocation can result in a spill. In the case of a construct, this spill is emitted by the decoder without a stall, because the construct instruction doesn't result in any other tile-path instruction. If a spill occurs for a copy construct, a stall is required (step 722) because two instruction are generated: the spill followed by the move to implement the copy. Allocated registers are recorded in an object register table, addressed by the object tracker.

Other instructions allocate registers as required, as shown in FIG. 8. In most cases, this simply involves looking up the register identifier in the object register table, but if the register has been spilled and re-used, this requires the register to be filled, which might in turn cause another register to be spilled. This can occur for any or all registers required by the decoded instruction, so a total of three spill and three fills might occur before the decoded can proceed, and can result in up to six stall cycles (note that when the result is a declared variable instead of a temporary result, the register must be filled before the assignment even though it is going to be written, because an object can be assigned by an object of smaller width, and this is defined to affect only the elements associated with the smaller width). However, spill and fill are very rare, so this is an extreme case—it is used as an illustration that regardless of the number of passes taken through this stage, the register allocation eventually reaches a condition where the decoder can proceed, assuming there are at least three registers defined in the hardware. A fourth register is also assumed because some instructions require registers for intermediate state between multiple decoded instructions, and this requirement isn't known until the instruction is further decoded.

As noted above, the central task of the decoder is to convert VPX instructions into tile-path instructions. This can require that the Decode Stage emit an instruction to convert operands to compatible datatypes before an operation is performed, resulting in a one-cycle stall. This also might initiate access requests to the Table-System Unit, and can require adding dependency information and access identifiers to the decoded instructions. These operations were overviewed previously, and the detail is beyond the scope of this document, but should be understood to be a relatively straightforward mapping to one of ordinary skill in the art in light of this disclosure.

The final task in the Decode Stage is to manage the optimization queue. This queue keeps a context of a few instructions, and holds back instructions from the I-Buffer stage in cases where an optimization might be possible. It conveys instructions to the I-Buffer stage when either the optimization is performed, or it is known that no optimization is possible.

I-Buffer Stage Detailed Operation

Figure 9:
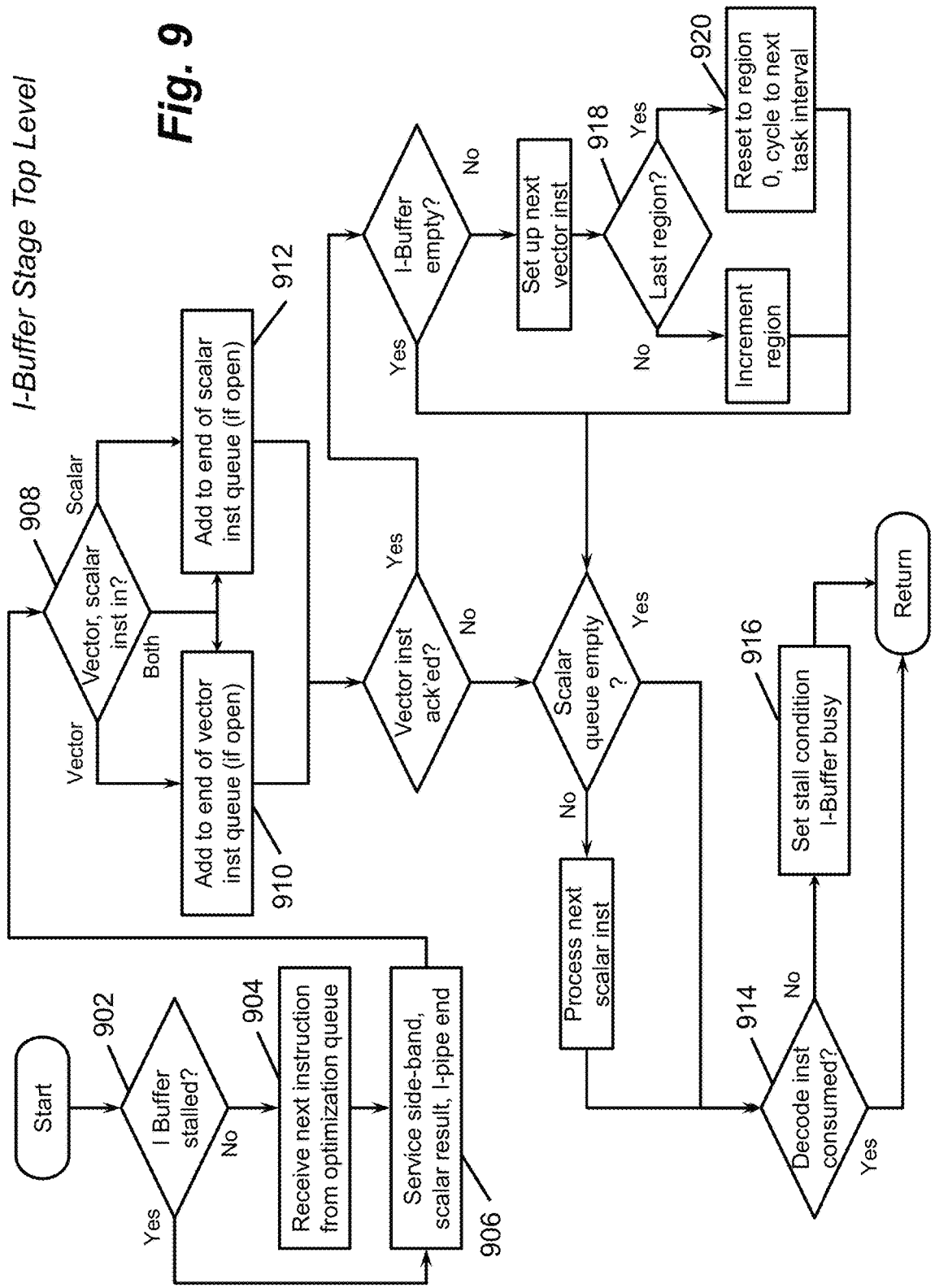
FIG. 9 is a flowchart illustrating an embodiment of a process carried out by an instruction generation unit described herein.

FIG. 9 shows a flow chart for the top-level operation of the I-Buffer stage when the specialized processor is a tile processor. This stage gates in a new instruction from the optimization queue only if it is not in a stalled condition (steps 902, 904) (and might not receive a new instruction if the Decode Stage is stalled). Regardless of whether it is stalled, it always services the sideband signals as described earlier (step 906), and detects whether the vector I-pipe has been idle for an unusually long period of time or that a barrier condition has been met.

When a new instruction is received, the first step is to place the instruction on the vector and/or scalar instructions queues (steps 908, 910, 912) (or both, in the case of a vector instruction that produces a scalar value). If the required queue entries are not free, this can result in a stall condition, which is detected as a final step due to the input instruction not being consumed by the I-Buffer Stage (steps 914, 916).

The second step is independent of the input instruction, and is performed regardless of whether a new instruction is received. If the previous vector instruction has been accepted by the tile array, the next instruction from the vector instruction buffer, if available, is set up as the next instruction to issue. This issuing implements multi-tasking across tile-path regions, so the same sequence of instructions within a task interval is repeated for each region. As each task interval completes, the region number is incremented until the task interval has been performed on the last region (step 918) (defined by the program). At this point, the region is set to the first region, and instruction issue proceeds to the next task interval (step 920). Again, this applies only if there are instructions in the buffer.

Independent of vector instruction processing, the I-Buffer stage also executes scalar instructions. These can involve either operating on one or two scalar values, setting a scalar register with a value received from a vector operation or from the host, or returning a scalar value to the host. All of these operations are performed for the first instruction in the scalar instruction queue, and only if all input operands are valid. Scalars produced by vector instructions become valid as a result of being received in a side-band packet and are placed into the appropriate queue entry. When scalar execution reaches this queue entry, the value is written into the scalar register file and is available for subsequent execution. If for some reason the same VectorSummary object is written more than once before its value is used, which can happen in certain program conditions, the scalar instruction queue recognizes this condition and does not use the scalar value until the most recent update is valid.

Certain terms are used throughout this disclosure to refer to particular system components. As one skilled in the art will appreciate, practitioners may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

The above discussion is directed to various embodiments of the systems, processors, and methods described herein. The embodiments disclosed should not be interpreted, or otherwise used, as limiting the scope of the disclosure, including any claims. In addition, one skilled in the art will understand that the preceding description has broad application, and the discussion of any embodiment is meant only to be exemplary of that embodiment, and not intended to suggest that the scope of the disclosure, including any claims, is limited to that embodiment.

The description provided herein is meant to be illustrative of the principles and various embodiments of the present invention. Numerous variations and modifications will become apparent to those skilled in the art once the above disclosure is fully appreciated. It is intended that any claims be interpreted to embrace all such variations and modifications.

What is claimed is:

1. An instruction generation unit configured to interface a host computer to a specialized processor, the instruction generation unit comprising:
   an attribute stage configured to
      receive from the host computer a host-program operation code and a first virtual host-program operand, wherein the first virtual host-program operand represents a first operand for the specialized processor, and
      expand the first virtual host-program operand into a first operand descriptor, wherein the first operand descriptor provides a description of the first operand in terms of one or more operand attributes;
   a decode stage configured to
      receive from the attribute stage the first operand descriptor and the host-program operation code,
      convert the host-program operation code to one or more translated instructions for execution by the specialized processor, and
      allocate storage locations for use by the specialized processor in executing the translated instructions,
      wherein at least one of the translated instructions comprises
         a portion designated for identification of a translated operand for the specialized processor,
         a portion designated for identification of an operation to be performed by the specialized processor upon the translated operand, and
         a portion designated for an additional parameter specific to operation of the specialized processor; and
   an instruction buffer stage configured to
      receive the translated instruction from the decode stage,
      place the one or more translated instructions into one or more instruction queues, and
      issue translated instructions from at least one of the one or more instruction queues for execution by the specialized processor.

2. The instruction generation unit of claim 1, wherein the attribute stage is further configured to
   receive from the host computer a second virtual host-program operand; and
   expand the second virtual host-program operand into a second operand descriptor.

3. The instruction generation unit of claim 1, further comprising a memory configured to store an attribute table comprising one or more operand descriptors, and wherein the attribute stage is further configured to
   determine whether the host-program operation code corresponds to an initial declaration of the first operand; and
   in response to a determination that the host-program operation code does correspond to an initial declaration of the first operand, store in the attribute table an entry comprising the first operand descriptor, and return to the host computer an address of the stored attribute table entry.

4. The instruction generation unit of claim 3, wherein the attribute stage is further configured to fetch the first operand descriptor from the attribute table, in connection with expanding the first virtual host-program operand into the first operand descriptor.

5. The instruction generation unit of claim 1, wherein the specialized processor comprises an array of at least two interconnected processing units, the processing units each comprising
an instruction buffer; and
a data memory partitioned into at least two regions.

6. The instruction generation unit of claim 5, wherein the first operand comprises a two-dimensional array of data stored across multiple regions of one or more of the data memories of the specialized processor.

7. The instruction generation unit of claim 5, wherein the storage locations allocated by the decode stage are within the processing units of the specialized processor.

8. The instruction generation unit of claim 5, wherein
the respective instruction buffers of the interconnected processing units are connected by an instruction pipeline configured to sequentially convey instructions from one processing unit to the next;
the one or more instruction queues comprise a vector instruction queue and a scalar instruction queue; and
the instruction buffer stage is further configured to place translated instructions from the vector instruction queue into the instruction pipeline, in connection with issuing the translated instructions from the one or more instruction queues.

9. A method of generating instructions for a specialized processor, the method comprising:
receiving from a host processor a host-program operation code and a first virtual host-program operand, wherein the first virtual host-program operand represents a first operand for the specialized processor;
expanding the first virtual host-program operand into a first operand descriptor, wherein the first operand descriptor provides a description of the first operand in terms of one or more operand attributes;
converting the host-program operation code to one or more translated instructions for execution by the specialized processor, wherein at least one of the translated instructions comprises
a portion designated for identification of a translated operand for the specialized processor,
a portion designated for identification of an operation to be performed by the specialized processor upon the translated operand, and
a portion designated for an additional parameter specific to operation of the specialized processor;
allocating storage locations for use by the specialized processor in executing the translated instructions;
placing the one or more translated instructions into one or more instruction queues; and
issuing translated instructions from at least one of the one or more instruction queues for execution by the specialized processor.

10. The method of claim 9, further comprising:
receiving from the host processor a second virtual host-program operand; and
expanding the second virtual host-program operand into a second operand descriptor.

11. The method of claim 9, further comprising:
determining whether the host-program operation code corresponds to an initial declaration of the first operand; and
in response to a determination that the host-program operation code does correspond to an initial declaration of the first operand, storing in an attribute table an entry comprising the first operand descriptor, and returning to the host processor an address of the stored attribute table entry.

12. The method of claim 11, wherein expanding the first virtual host-program operand into the first operand descriptor comprises fetching the first operand descriptor from the attribute table.

13. The method of claim 9, wherein the specialized processor comprises an array of at least two interconnected processing units, the processing units each comprising
an instruction buffer; and
a data memory partitioned into at least two regions.

14. The method of claim 13, wherein the first operand comprises a two-dimensional array of data stored across multiple regions of one or more of the data memories of the specialized processor.

15. The method of claim 13, wherein allocating storage locations comprises allocating storage locations located within the processing units of the specialized processor.

16. The method of claim 13, wherein:
the respective instruction buffers of the interconnected processing units are connected by an instruction pipeline configured to sequentially convey instructions from one processing unit to the next;
the one or more instruction queues comprise a vector instruction queue and a scalar instruction queue; and
issuing the translated instructions from the one or more instruction queues comprises placing translated instructions from the vector instruction queue into the instruction pipeline.

17. A data processing system, comprising:
a host computer configured to run a compiled program;
a specialized processor; and
an instruction generation unit operably coupled to the host computer and to the specialized processor, wherein the instruction generation unit is configured to
receive from the compiled program a host-program operation code and a virtual host-program operand, wherein the virtual host-program operand represents an operand for the specialized processor,
convert the host program operation code to one or more translated instructions for execution by the specialized processor,
allocate storage locations for use by the specialized processor in executing the translated instructions,
place the one or more translated instructions into one or more instruction queues, and
issue translated instructions from at least one of the one or more instruction queues for execution by the specialized processor, wherein at least one of the translated instructions comprises
a portion designated for identification of a translated operand for the specialized processor,
a portion designated for identification of an operation to be performed by the specialized processor upon the translated operand, and
a portion designated for an additional parameter specific to operation of the specialized processor.

18. The data processing system of claim 17, wherein the specialized processor comprises an array of at least two interconnected processing units, the processing units each comprising
an instruction buffer; and
a data memory partitioned into at least two regions.

19. The data processing system of claim 18, wherein
- the respective instruction buffers of the interconnected processing units are connected by an instruction pipeline configured to sequentially convey instructions from one processing unit to the next;
- the one or more instruction queues comprise a vector instruction queue and a scalar instruction queue; and
- the instruction generation unit is further configured to place translated instructions from the vector instruction queue into the instruction pipeline, in connection with issuing the translated instructions from the one or more instruction queues.

20. The instruction generation unit of claim 1, wherein the additional parameter specific to operation of the specialized processor comprises information relating to data dependencies arising from asynchronous operation among elements of the specialized processor.

* * * * *